United States Patent Office 3,767,620
Patented Oct. 23, 1973

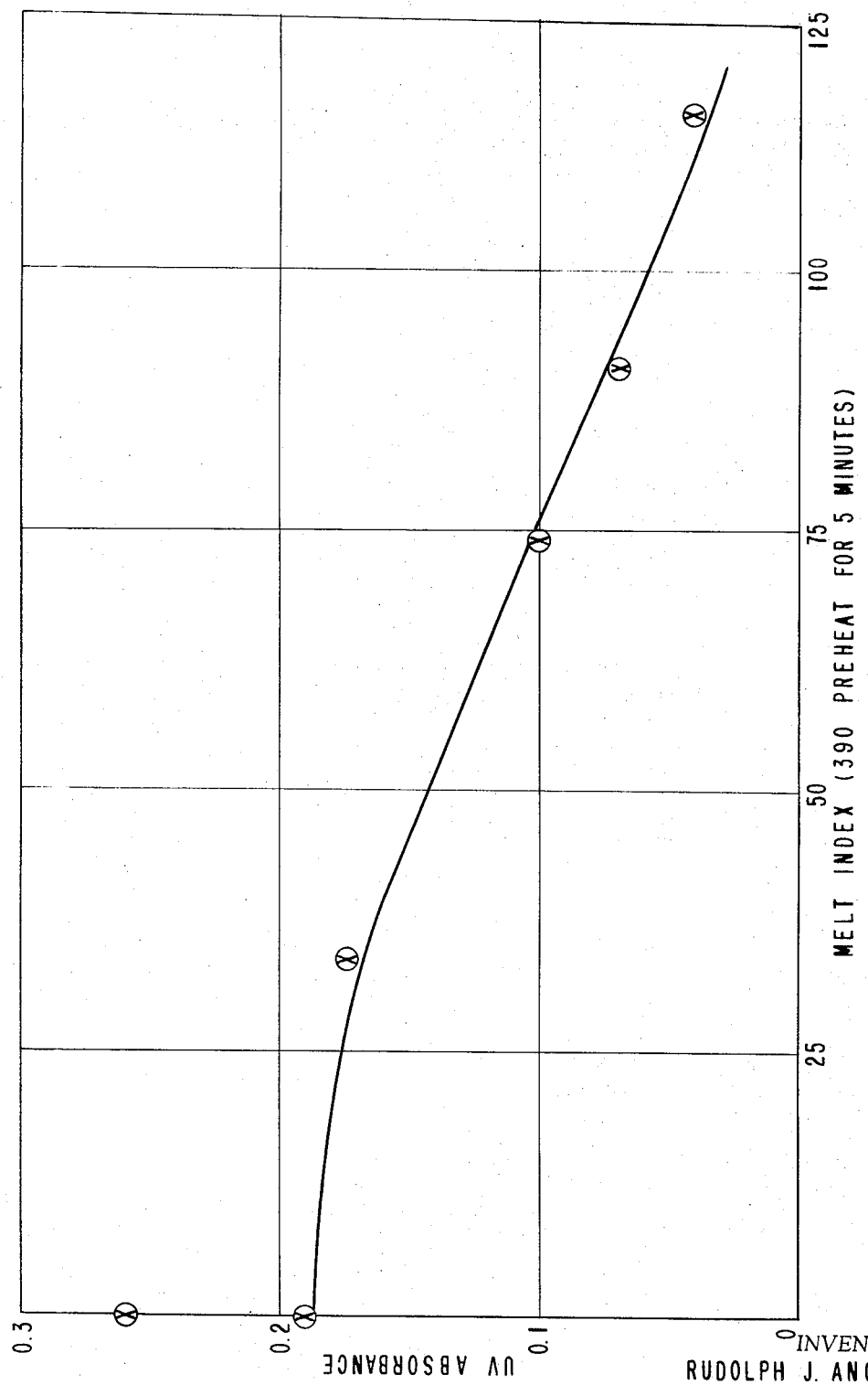

3,767,620
MELT STABLE POLYKETONE
COMPOSITIONS
Rudolph J. Angelo, Wilmington, Del., Roland Darms, Therwil, Switzerland, and Robert D. Wysong, Wilmington, Del., assignors to E. I. du Pont de Nemours and Company, Wilmington, Del.
Filed Nov. 24, 1971, Ser. No. 201,872
Int. Cl. C08g 23/20
U.S. Cl. 260—47 R           5 Claims

ABSTRACT OF THE DISCLOSURE

Polyketones derived from diphenyl ether and terephthaloyl and isophthaloyl halides by Friedel-Crafts synthesis having superior melt stability, and a process for their preparation comprising reducing xanthydrol endgroups to xanthene groups.

BACKGROUND OF THE INVENTION

Polyketones based on diphenyl ether and terephthaloyl and isophthaloyl halides are known to possess desirable and useful chemical and physical properties. Their good electrical properties, coupled with resistance to thermal oxidative and hydrolytic degradation, made them good candidates for electrical insulation, but these polymers tend to degrade and undergo decomposition during attempts to extrude them.

SUMMARY OF THE INVENTION

The present invention provides polyketones based on diphenyl ether and terephthaloyl and isophthaloyl halides having substantially greater thermal stability than known polymers of this type. There is further provided a process for the preparation of such polyketones.

Specifically, the instant invention provides Friedel-Crafts polyketones of film-forming molecular weight prepared from diphenyl ether and at least one of terephthaloyl and isophthaloyl halides, which polyketones contain a percentage of 9-phenylenexanthydrol end groups as to exhibit an ultraviolet absorbance at 4550 angstrom units of less than about 0.18.

The invention further provides a process for the preparation of polyketones of improved thermal stability comprising bringing into contact a polyketone prepared from diphenyl ether and at least one of terephthaloyl and isophthaloyl halides and a chemical reducing agent in an acidic environment for a time sufficient to reduce the number of 9-phenylenexanthydrol end-groups to exhibit an ultraviolet absorbance at 4550 angstrom units of less than about 0.18.

BRIEF DESCRIPTION OF THE DRAWING

The figure is a graphical representation of the relationship of the ultraviolet absorbance and the melt index of a copolyketone having a 70:30 T:I ratio. The absorbance is measured at 4550 angstrom units on a dichloroacetic acid solution of the polymer of one milligram of polymer per milliliter of solution.

DETAILED DESCRIPTION OF THE INVENTION

Polyketones of the tpye to which the instant invention relates can be produced by Friedel-Crafts synthesis, as described in U.S. Pat. 3,065,205 and 3,441,538. The most widely used catalysts are AlCl₃ with solvents such as nitrobenzene, chlorobenzene, o-dichlorobenzene, liquid hydrogen bromide, p-dichlorobenzene or methylene chloride; and BF₃ with solvents such as anhydrous hydrogen fluoride. The invention is based on the discovery that polyketones prepared from diphenyl ether and terephthaloyl and isophthaloyl halids in the presence of Friedel-Crafts catalysts invariably contain 9-phenylenexanthydrol end-groups, generally in the amount of about from 0.6 to 1.0% by weight. These 9-phenylenexanthydrol end-groups have been found to be a major factor in the poor melt stability of this type of polyketone.

The polyketone materials to which the instant invention is applicable have the repeating structural formula

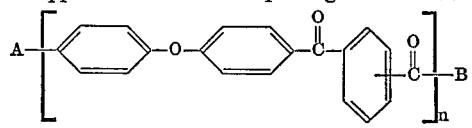

wherein A is selected from at least one of the group consisting of

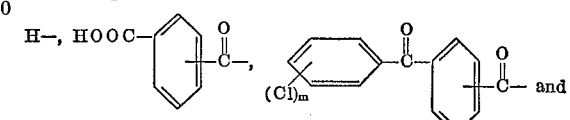

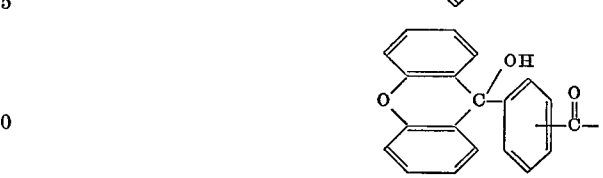

B is selected from at least one of the group consisting of

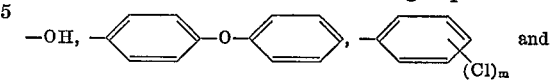

and

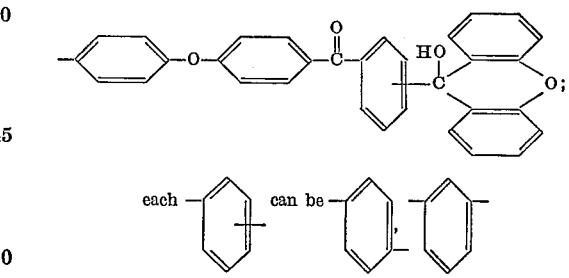

or any mixture thereof; $n$ is an integer providing a molecular weight sufficient for a self-supporting film, as evidenced by an inherent viscosity of at least 0.4; $m$ is 1 or 2; and the number of

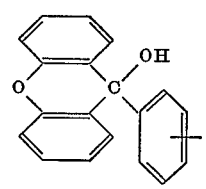

(9-phenylenexanthydrol) moieties is such that the ultraviolet absorbance of the polymer at a wavelength of 4550 angstrom units is greater than 0.20 and generally greater than about 0.25.

It has been found that in these polyketone materials, the chemical reduction of 9-phenylenexanthydrol groups to the corresponding 9-phenylenexanthene groups provides a polyketone with remarkably improved thermal stability. After reduction, a substantial percentage of A and B 9-phenylenexanthydrol end groups represented in the formula above as

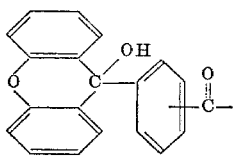

and

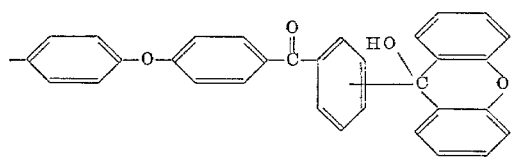

are transformed to

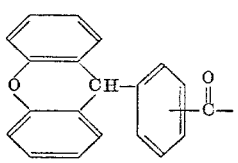

and

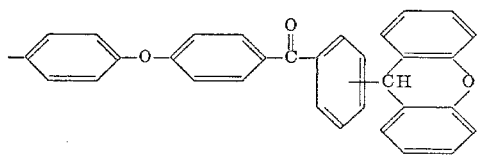

respectively.

The most reliable method found to measure the extent of the reduction of these undesirable end groups is the ultraviolet absorbance of the polymer at the wavelength of the unreduced end group. Thus, the absorbance, at 4550 angstrom units, of polyketones prepared by Friedel-Crafts synthesis is greater than 0.20 and generally greater than about 0.25, while the absorbance of the reduced, thermally stable compositions is less than 0.18. The absorbance of the polymer is measured, for purposes of the present invention, using conventional techniques, in dichloroacetic acid solution of one milligram of the polymer per milliliter of solution. The absorbance should be measured on a freshly prepared solution to prevent inaccuracy due to oxidation of the solution upon exposure to light.

Also based on ultraviolet absorption, general estimates of the weight percentage of unreduced 9-phenylenexanthydrol end units of the polyketone can be obtained. For example, the absorbance at 4550 angstrom units of a model phenylenexanthydrol unit can be compared to that of a polyketone containing this end group. However, the weight percentages of end units will vary markedly with the molecular weight of the polymer. In general, for polyketones having a molecular weight evidenced by an inherent viscosity of 0.4 to 1.0, it has been found that unreduced Friedel-Crafts polymer has about from 0.6 to 1.0% by weight of polymer, of 9-phenylenexanthydrol end groups, while thermally stable, reduced polymer, having an ultraviolet absorbance of less than about 0.18, has less than about 0.5% by weight of the polymer, of unreduced end groups.

The phenylenexanthydrol end units have the same undesirable effect on polymers prepared from terephthaloyl halides, isophthaloyl halides, and mixtures thereof. However, those polymers prepared from terephthaloyl halides exclusively inherently have poorer melt and flow characteristics than those prepared from mixtures of terephthaloyl and isophthaloyl halides or isophthaloyl halide exclusively. The reduction of the xanthydrol groups permits heating and melt extrusion of the reduced polymer without charring.

It is often found that in the preparation of polyketones by the usual methods, the freshly synthesized polymer is swollen with solvent and complexed with the catalyst, both of which must be nearly completely removed for acceptable melt processing. Alcohol or other organic solvents can be used for the polymer purification, but the alcohol handling and recovery adds to the cost and hazard of the manufacture of the polyketone. Accordingly, it is preferred to use water in this operation. To prevent undue swelling of the polymer when water is used for cleanup, it is preferred that the water be added as a saturated aqueous HCl or NaCl solution. When these solutions are added to the freshly synthesized polymer, the solvent can be steam distilled off and the catalyst can be washed out along with other impurities by subsequent water washing with no swelling.

The reduction of the xanthydrol end groups, according to the instant invention, is accomplished by bringing the polyketone material into contact with a chemical reducing agent in an acidic environment for a time sufficient to reduce the xanthydrol end groups to the required level. Representative reducing agents which can be used in the instant invention include primary and secondary alkanols in combination with hydrogen chloride; formic acid; and silanes, e.g., trialkylsilanes such as triethylsilane.

The reduction can be carried out either with the polymer dissolved in a solvent such as dichloroacetic acid, or on solid particles of the polymer suspended in a liquid medium such as ethanol or acetic acid, or on solid particles of the polymer exposed to the vapors of the reducing agent.

Temperatures used can vary about from room temperature to the boiling point of the system used, depending on the nature of the reducing system and on whether the reaction system is homogeneous or heterogeneous. When the reduction is carried out by contacting the polymer with vapors of the reducing agent, temperatures either below or in excess of the boiling point of the reducing agent can be used.

The actual physical arrangement of apparatus in the course of the reduction can vary widely. When formic acid is used as a reducing agent, polymer particles can be treated by suspending in formic acid, or a solution of formic acid in acetic acid or water, and heating, to at least about 100° C., and preferably to the boiling point. In a preferred method, the polymer particles are wet with an aqueous solution of formic acid and dried by heating to at least about 100° C.; the reduction occurring during the drying step. In another preferred method, a tray of dry or water wet polymer is contacted at elevated temperatures with formic acid vapor either above or below the boiling point of formic acid. In such methods, the formic acid is oxidized to carbon dioxide and water. Polymer particles can be treated by suspending in a solution of hydrogen chloride in ethanol and heating the solution to boiling. As xanthydrol end-groups are reduced, ethanol is oxidized to acetaldehyde. Other alcohols that can be used as a medium for hydrogen chloride include any primary or secondary aliphatic alcohol or aryl carbinol.

By way of further example, a solution of polyketone in dichloroacetic acid can be contacted with triethylsilane to chemically reduce the xanthydrol end-groups. The reducing agent is sufficiently reactive that room temperature is adequate in this system. In this procedure, triethylsilane is oxidized to triethylsilicol.

The polymers of this invention are useful as films, fibers, molding powder, components of coating lacquers and the like. They exhibit excellent electrical properties and are accordingly useful as electrical insulation in various forms. They are also useful as packaging films as well as woven and nonwoven fabrics. The improved high temperature stability of the compounds of the present invention greatly facilitates extrusion operations. This stability makes the polymer easier to handle, permits greater flexibility in the selection of extrusion temperatures, enables the operation of extruders for longer times without shutdown for cleaning, and permits temporary stopping of extrusion equipment without purging the system. In addition, the present polymers exhibit a lighter color and greater transparency than the unreduced polymer, expanding their applicability to uses in which transparency is required.

If the procedures specified in the following specific examples are carried out, the indicated results will be obtained. The melt index, expressed in grams/10 minutes, is measured in accordance with ASTM-D-1238-62T.

The inherent viscosity is measured at 23° C. at a concentration of 0.5% by weight of the copolymer in concentrated sulfuric acid. To calculate inherent viscosity, the viscosity of the polymer solution is measured relative to that of the acid alone, and calculated from the following equation:

$$\text{Inherent viscosity} = \frac{\text{natural logarithm} \frac{\text{viscosity of solution}}{\text{viscosity of acid solvent}}}{C}$$

where C is the concentration expressed in grams of polymer per 100 milliliters of solution.

Example 1

A copolyketone is prepared by Friedel-Crafts synthesis from diphenyl ether, terephthaloyl chloride and isophthaloyl chloride in quantities such that the T:I ratio of the product is 70:30. This polyketone product has an inherent viscosity of 0.87 and a substantial percentage of 9-phenylenexanthydrol end groups, as evidenced by a UV absorbance at 4550 angstrom units of greater than 0.25. The polymer degrades when heated to extrusion temperatures.

This polymer is soaked in 12 liters of 6% aqueous formic acid for 75 minutes, filtered and spread onto glass trays. The trays are heated in a vacuum oven at 130 to 170° C. at a pressure of 25 to 27 inches of vacuum for two hours and are then heated 17.5 hours at 170° C. and a pressure of 27 inches of vacuum. The resulting dried polymer is white and exhibits an inherent viscosity of 0.87. The percentage of phenylenexanthydrol end groups is markedly reduced, as evidenced by a UV absorbance of 0.03. The polymer exhibits a melt index, after preheating at 390° C. for 5 and 30 minutes, respectively, of 124 and 105.

The polymer is successfully extruded to a transparent, light yellow film having a thickness of about 5 mils by melt extruding at a pressure of about from 100 to 400 p.s.i. through a slit die having a 15 mil opening and a die temperature of about 365° C. The film is extruded onto an uncooled metal drum.

Example 2

A copolyketone is prepared by Friedel-Crafts synthesis from diphenylether, terephthaloyl chloride and isophthaloyl chloride in quantities such that the T:I ratio of the product is 70:30. The polymer has an inherent viscosity of 1.0 and a percentage of 9-phenylenexanthydrol end groups such that the UV absorbance is 0.3.

A quantity of the copolyketone polymer (74 g.) is dissolved by stirring in 630 ml. of dichloroacetic acid. The polymer is then reduced by adding to the solution 4 ml. of triethylsilane in 1-ml. portions at five minute intervals. After 1 hr., an additional 1 ml. of triethylsilane is added and the stirring continued for 30 minutes. The polymer solution is poured slowly into distilled water and ice in a blendor. The precipitated white polymer is collected and soaked in 2 liters of N,N-dimethylacetamide for 12 days, again collected and consecutively washed in N,N-dimethylacetamide, distilled water and methanol. The polymer is dried and found to have an absorbance of 0.03. The polymer exhibits a melt index, with 5, 10 and 30 minutes of preheating at 375° C., respectively, of 51, 19.7 and 0.3 and can be melt extruded into a film.

Example 3

A silimar copolyketone having a T:I ratio of 70:30 is prepared having an inherent viscosity of 0.9 and a UV absorbance of greater than 0.25. 50 g. of the freshly polymerized red granules are placed in a 4-liter resin kettle equipped with a subsurface inlet tube and reflux condenser. The kettle is charged with 1.5 liters of glacial acetic acid and 55 milliliters of 98% formic acid. Dry hydrogen chloride is bubbled continuously through the liquid which is held at reflux. The solid polymer is filtered from the suspension and the refluxing and filtration process repeated five times with fresh quantities of acetic acid and formic acid, for a total reflux time of 8 hrs.

The resulting polymer filtered from the suspension is washed with acetic acid and water until neutral. The polymer is purified by direct steam distillation and dried at 150° in a vacuum oven for 16 hrs.

The resulting polymer has a substantially reduced percentage of 9-phenylenexanthydrol end units as evidenced by a UV absorbance of less than 0.1 at 4550 angstrom units and can be melt extruded into a film. After preheating at 390° C. for 5, 30 and 60 minutes, the polymer exhibits, respectively, a melt index of 100, 85 and 51.

Example 4

The procedure of Example 3 is repeated, except the polymer used is prepared from diphenyl ether and terephthaloyl chloride exclusively, the polymer has an inherent viscosity of 0.68 and the dry hydrogen chloride bubbled through the liquid as in Example 3 is omitted. The initial polymer contains a substantial quantity of 9-phenylenexanthydrol end units as indicated by a UV absorbance of greater than 0.25 and the polymer degrades upon heating for extrusion. After treatment, the polymer can be melt extruded into a film and exhibits a UV absorbance of less than 0.1. After preheating at 410° C. for 5, 30 and 60 minutes, the polymer exhibits a melt index respectively of 10, 107 and 13.

Example 5

A polyketone having an inherent viscosity of 0.75 is prepared using quantities of terephthaloyl chloride and isophthalyol chloride to give a final T:I ratio of 80:20. The polymer cannot be melt extruded into a film and contains a substantial percentage of 9-phenylenexanthydrol end units as indicated by a UV absorbance of greater than 0.25.

Six grams of polymer is dissolved (under nitrogen) in 180 milliliters of dichloroacetic acid containing 2 milliliters of triethylsilane. The solution is stirred at room temperature for 1 hr. and then poured into excess water. The precipitated polymer is filtered out and washed with water and acetone. The resulting polymer, after drying, is capable of melt extrusion into a film and exhibits a markedly reduced percentage of 9-phenylenexanthrydrol end units as indicated by an absorbance of less than 0.1. The polymer is preheated at a temperature of 390° C. for 5, 30 and 60 minutes and exhibits a melt index, respectively, of 535, 192 and 216.

Example 6

Polyketone having a 70:30 T:I ratio and an inherent viscosity of 0.80 is prepared substantially as in Example 1, and approximately 1 mole of this polyketone, in the form of a gel, is placed in 5.4 liters of ethanol in a creased flask blanketed with nitrogen. This suspension is refluxed for 30 minutes while dry hydrogen chloride is continuously bubbled through with stirring. The suspension is then cooled and the alcohol siphoned off, a fresh charge of alcohol added and the process repeated three times to change the initial bright yellow color to white. The resulting polymer is then washed with water, placed in a flask containing water, and subjected to direct steam distillation under nitrogen until the distillate is clear. The polymer is filtered off and then dried for 16 hrs. at 200° C. in a vacuum oven. The percentage of 9-phenylenexanthydrol end units is markedly reduced, as evidenced by a UV absorbance of less than 0.1. The reduced polymer can be melt extruded into a film, and, after heating at 390° C. for 5, 30 and 60 minutes, the polymer exhibits a melt index, respectively, of 125, 109 and 114.

Example 7

Example 6 is repeated, except that polymer having an inherent viscosity of 0.96 is used and isopropyl alcohol is used in place of ethanol. The resulting reduced polymer exhibits a melt index, after preheating for 5, 30 and 60 minutes, of 28, 32 and 20, respectively, and exhibits a UV absorbance of less than 0.1.

Examples 8-13

In Examples 8–13, copolyketones are prepared from diphenyl ether and terephthaloyl and isophthaloyl chlorides to give products having a T:I ratio of 70:30. The copolyketones have varying initial inherent viscosities, and all have an initial UV absorbance in excess of 0.25. The polymers are reduced to varying extents, using, in Examples 8–11, the method of Example 6, and, in Examples 12–13, the method of Example 4. The absorbance and melt characteristics of the resulting polymers are measured and recorded in the following table, the Melt Index being measured after preheating at 390° C. for the indicated number of minutes.

The Melt Index and Absorbance of each polymer sample, after reduction, after five minutes of preheating, is recorded in the figure.

TABLE

| Example | UV absorbance | Extrudate description | Melt index | Preheat (min.) | Initial inherent viscosity |
|---|---|---|---|---|---|
| 8 (Control) | 0.263 | Dark | (¹) | 5 | 0.92 |
| 9 (Control) | 0.190 | ____do____ | (¹) | 5 | 1.10 |
| 10 | 0.175 | Brown, rough | 34 | 5 | 0.85 |
|  |  | ____do____ | 16 | 30 |  |
|  |  | Black, rough | 49 | 60 |  |
| 11 | 0.102 | Very light tan | 74 | 5 | 0.93 |
|  |  | Tan | 64 | 30 |  |
|  |  | Light brown | 51 | 60 |  |
| 12 | 0.067 | Light tan | 91 | 5 | 0.87 |
|  |  | ____do____ | 83 | 30 |  |
|  |  | Tan | 85 | 60 |  |
| 13 | 0.037 | Clear, amber | 115 | 5 | 0.87 |
|  |  | Clear, light brown | 91 | 30 |  |
|  |  | ____do____ | 83 | 60 |  |

¹ No flow.

We claim:

1. A polyketone of film-forming molecular weight prepared by Friedel-Crafts synthesis from diphenyl ether and at least one of terephthaloyl and isophthaloyl halides, which polyketone contains a percentage of 9-phenylenexanthydrol end groups such that the polyketone exhibits an ultraviolet absorbance at 4550 angstrom units of less than about 0.18 measured in dichloroacetic acid solution at a concentration of one milligram per milliliter of solution.

2. A film of the polymer of claim 1.

3. A process for the preparation of melt stable polyketone comprising bringing into contact (a) a polyketone prepared by Friedel-Crafts synthesis from diphenyl ether and at least one of terephthaloyl and isophthaloyl halides and (b) a chemical reducing agent for a time sufficient to reduce the number of 9-phenylenexanthydrol end groups to a quantity such that the polyketone exhibits an ultraviolet absorbance at 4550 angstrom units of less than about 0.18 measured in dichloroacetic acid at a concentration of one milligram per milliliter of solution.

4. A process of claim 3 wherein the chemical reducing agent is selected from (a) ethanol and hydrogen chloride, (b) formic acid and (c) triethylsilane and an acid medium.

5. A process of claim 4 wherein the polyketone is brought into contact with formic acid vapor at a temperature of at least 100° C.

References Cited

UNITED STATES PATENTS 3,065,205   11/1962   Bonner _____ 260—63
3,637,592   1/1972    Berr _____ 260—47
3,668,057   6/1972    Agolini et al. _____ 161—165

MELVIN GOLDSTEIN, Primary Examiner

U.S. Cl. X.R.

260—61